United States Patent [19]

Yamadera et al.

[11] Patent Number: 5,444,477
[45] Date of Patent: Aug. 22, 1995

[54] VIDEO TELEPHONE SYSTEM

[75] Inventors: Hitoshi Yamadera; Takafumi Kawasaki, both of Kokubunji; Takashi Matsubara, Kodaira; Hiroaki Takatsuki, Tokyo; Atsuo Yoshida, Kokubunji; Yoji Shibata, Yokosuka; Masumi Fukano, Fujisawa; Kiyoshi Ishida, Yokohama; Iwao Ishinabe, Koganei, all of Japan

[73] Assignee: Hitachi, Ltd., Tokyo, Japan

[21] Appl. No.: 139,745

[22] Filed: Oct. 22, 1993

[30] Foreign Application Priority Data

Oct. 23, 1992 [JP] Japan .................. 4-286464

[51] Int. Cl.[6] .................. H04N 7/14; H04M 3/42
[52] U.S. Cl. .................. 348/15; 348/13; 379/202
[58] Field of Search .................. 348/14–20, 348/564, 565; 379/201, 202, 203, 204, 205, 212; H04N 7/140

[56] References Cited

U.S. PATENT DOCUMENTS 4,650,929  3/1987  Boerger et al. .................. 348/15
4,965,819  10/1990  Kannes .................. 348/15

FOREIGN PATENT DOCUMENTS 0061581  3/1986  Japan .................. H04N 7/140
0103384  5/1986  Japan .................. H04N 7/140

OTHER PUBLICATIONS

The article "Key Systems for Picturephone Service" by A. Daskalakis, Oct. 1971, pp. 270–277.

*Primary Examiner*—Curtis Kuntz
*Assistant Examiner*—Jason Chan
*Attorney, Agent, or Firm*—Antonelli, Terry, Stout & Kraus

[57] ABSTRACT

A video telephone system which includes a master video telephone terminal (secretary terminal) connected to a communication network and slave video telephone terminals (executive terminals) connected to the master video telephone terminal in which the master video telephone terminal can transfer a call to the slave video telephone terminals. When a call comes into the secretary terminal from a remote terminal on the communication network, a line control section of the secretary terminal sets up a line. Video data and speech data received on the line are decoded by a video signal coding-decoding section and an aural signal coding-decoding section and the decoded signals are output through a display and a speech output device. Sound and images picked up by a microphone and a camera respectively are coded for transmission. Then, if a predetermined instruction of call transfer to an executive terminal is entered on an electronic tablet of the secretary terminal, a communication branch control section of the secretary terminal calls the executive terminal, sets up a line between the secretary and executive terminals on a local transmission network, and connects the line between the secretary terminal and the remote terminal.

5 Claims, 8 Drawing Sheets

VIDEO TELEPHONE SYSTEM

BACKGROUND OF THE INVENTION

This invention relates to a video telephone system which enables two-way simultaneous communication of speech, dynamic image, character and graphics information, etc., to which a digital communication line is applied.

A video telephone and a video conference system are known as conventional apparatus for enabling two-way simultaneous communication of speech, dynamic images, etc. Two-way simultaneous communication of speech, dynamic images, etc., is made between video telephones or video conference systems directly connected over a communication line, and information such as documents and graphs required when the video telephones or video conference systems are busy are generally exchanged by using other machines such as facsimiles.

Also known is a video conference system of the type wherein three or more video telephones and video conference systems are connected over a multipoint line for bidirectional simultaneous communication of speech, dynamic images, etc., by three or more parties.

However, in government offices, enterprises, etc., it is necessary, even in the video conference system as described above, for a secretary or a receptionist to once receive an incoming call and then transfer it to the person intended for communication by the calling party as with conventional telephones. In contrast, it is also required that a secretary or the like should set up communication and then connect the outgoing call to his or her superiors.

If data or materials such as documents and graphs are transferred by facsimile communication in the conventional video conference system as described above, a conference must be interrupted each time the facsimile communication occurs and so the operability of the video conference system is not good. It is impossible for both communicating parties to point out a graph or enter remarks in material simultaneously which may be inconvenient for a particularly detailed description.

SUMMARY OF THE INVENTION

Accordingly, it is an object of the invention to provide a video telephone system which can transfer an incoming call from a main video telephone terminal to another video telephone terminal.

It is another object of the invention to provide a video telephone system which can transfer materials such as documents and graphs at high speed even when a video telephone terminal is busy, and enables both communicating parties to handle the materials at the same time.

To these ends, according to one embodiment of the invention, there is provided a video telephone system comprising a master video telephone terminal connected to a communication network and a plurality of slave video telephone terminals connected to the master video telephone terminal, the master video telephone terminal includes:

Apparatus for accepting an instruction of call transfer to a specific slave video telephone terminal after communication with a remote video telephone terminal connected to the communication network is started; and Apparatus for transferring a call between the master video telephone terminal and the remote terminal connected to the communication network to the specific slave video telephone terminal.

DESCRIPTION OF PREFERRED EMBODIMENTS

Referring now to the accompanying drawings, there is shown a video telephone system according to one embodiment of the invention.

Figure 1:
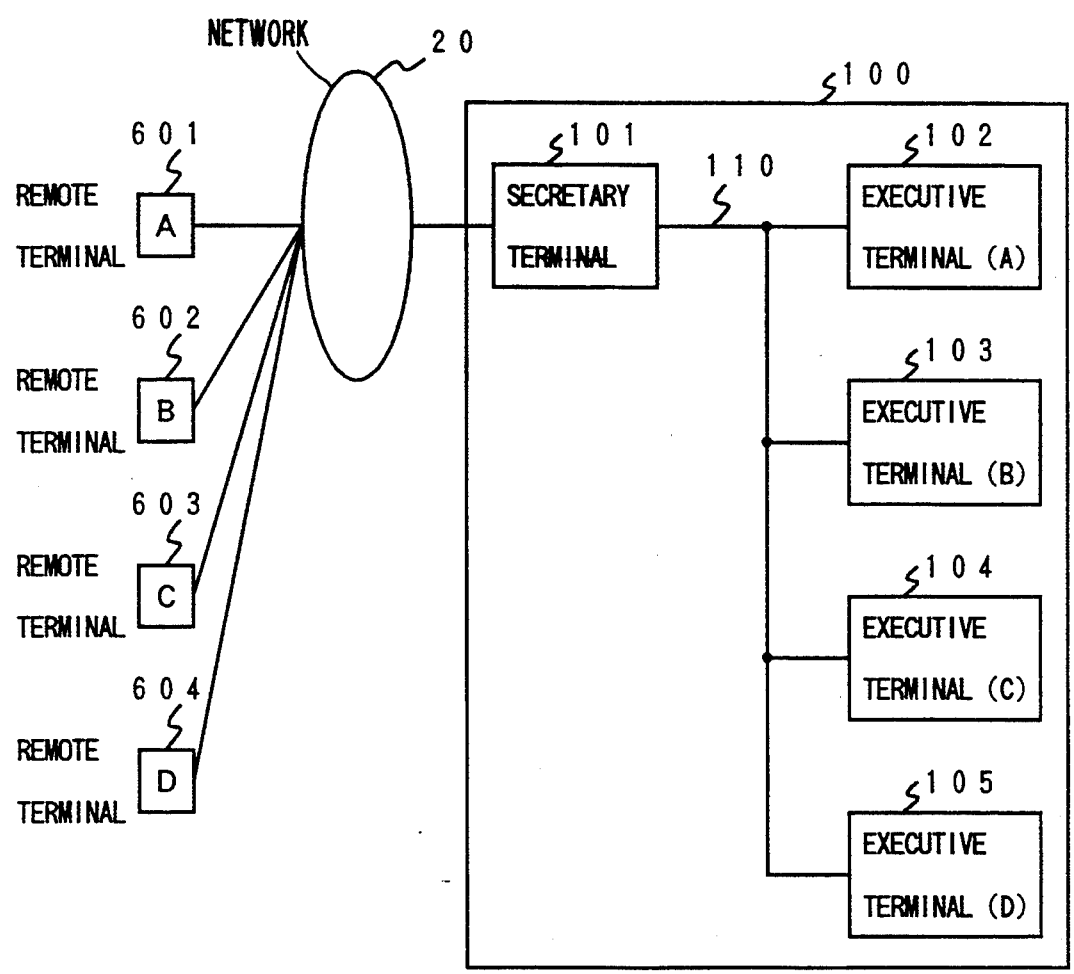
FIG. 1 is a block diagram showing the configuration of a video telephone system according to one embodiment of the invention.

FIG. 1 shows the overall configuration of the video telephone system according to the embodiment, wherein numeral 100 is the video telephone system which includes a secretary terminal 101 connected to a digital communication network 20 such as ISDN and a plurality of executive terminals 102-105 connected to the secretary terminal 101 over a local transmission network 110 where at least four lines can be set.

The video telephone system according to the embodiment enables the executive terminals 102-105 to make two-way simultaneous communication of speech, dynamic images, general data, etc., with remote terminals 601-604 connected to the digital communication network 20 through the secretary terminal 101 and the digital communication network 20.

Figure 2:
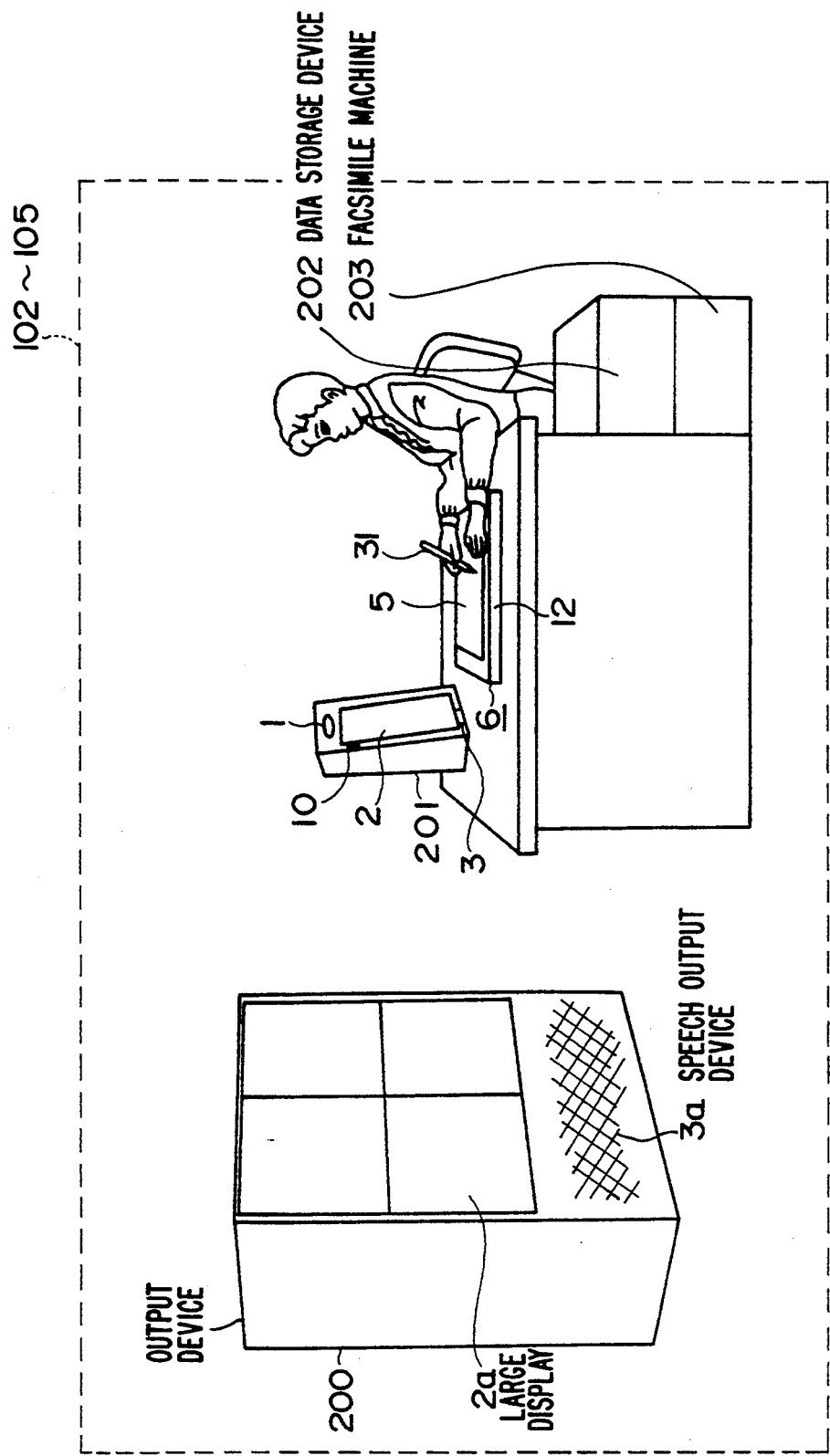
FIG. 2 is an illustration showing the configuration of an executive terminal installed in the video telephone system shown in FIG. 1.

Next, FIG. 2 shows the configuration of the executive terminal 102.

As illustrated here, the executive terminal 102 has an output device 200 comprising a large display 2a provided with a large screen and a speech output device 3a, a terminal 201 comprising a camera 1, a display 2, a microphone 10, and a speech output device 3, an electronic tablet 6, a small electronic input device 31, and external devices such as a data storage device 202 and a facsimile machine 203.

The level angle of the terminal 201 can be adjusted as desired. The electronic tablet 6, which comprises a transparent input panel 5 mounted on a liquid crystal display 12, is adapted to enable the user to enter drawing information with the small electronic input device 31.

The secretary terminal 101 is not provided with the output device 200 contained in the executive terminal 102.

Figure 3:
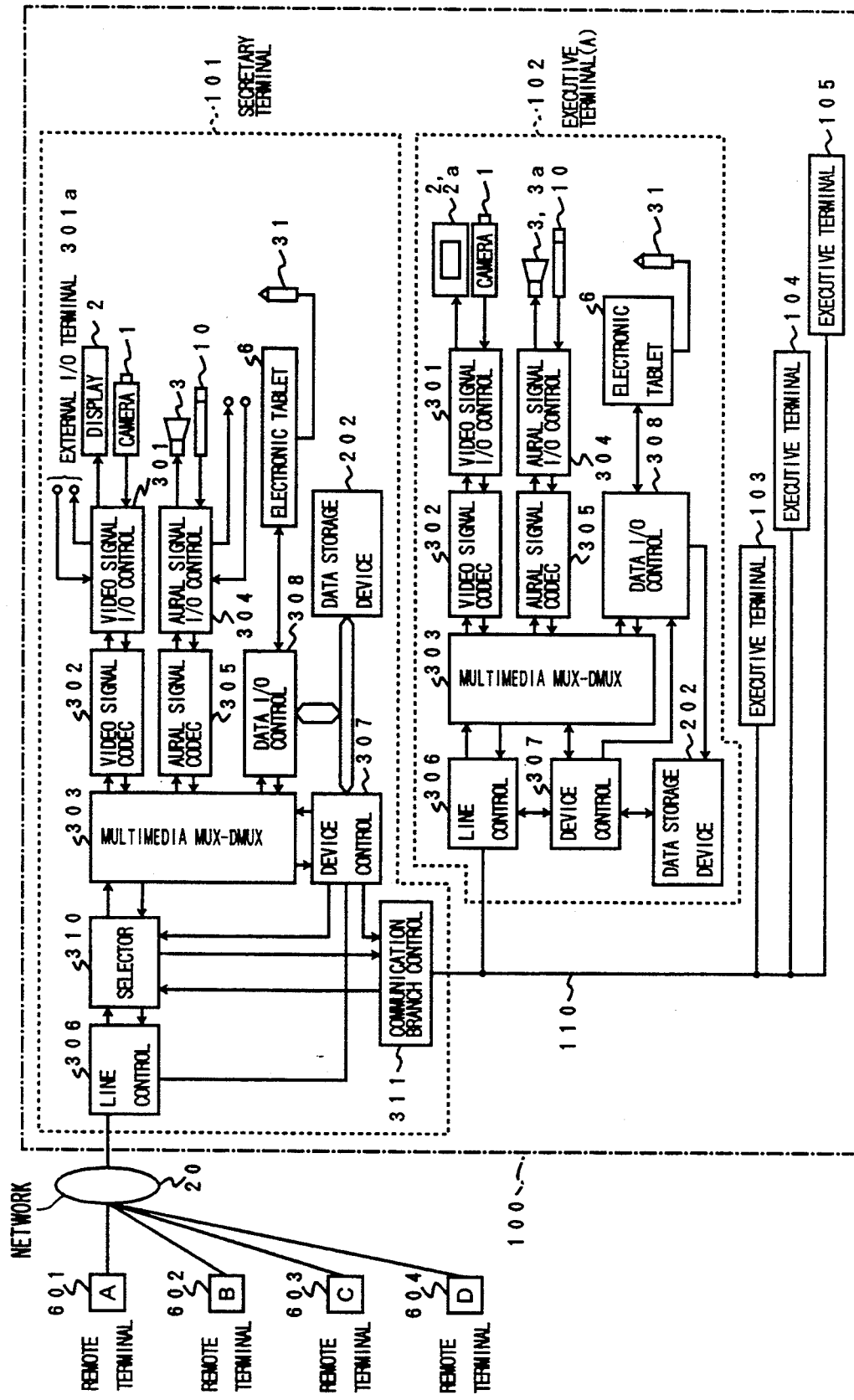
FIG. 3 is a block diagram showing the internal configuration of the video telephone system according to the embodiment of the invention.

Next, FIG. 3 shows the internal configuration of the secretary terminal 101 and executive terminals 102-105.

First, the sections common to the secretary terminal 101 and the executive terminals 102-105 are described.

In FIG. 3, numeral 301 is a video signal input/output control section, numeral 302 is an image coding-decoding section, numeral 303 is a multimedia multiplexing-demultiplexing section, numeral 304 is an aural signal input/output control section, numeral 305 is an aural signal coding-decoding section, numeral 306 is a line control section, numeral 307 is a device control section, numeral 308 is a data input/output control section, numeral 202 is a data storage device, numeral 310 is a selector, and numeral 311 is a communication branch control section.

The video signal input/output control section 301 sends a video signal provided by the camera 1 to the image coding-decoding section 302 which then codes the video signal to generate a digital image signal compressed to a data transfer rate appropriate for the transmission band of the communication line according to the system conforming to CCITT Recommendation H.261, and outputs the digital image signal to the multimedia multiplexing-demultiplexing section 303.

An aural signal input through the microphone 10 is sent from the aural signal input/output control section 304 to the aural signal coding-decoding section 305 which then codes the aural signal and outputs the coded signal to the multimedia multiplexing-demultiplexing section 303.

When the user makes a handwritten entry on the electronic tablet 6 with the small electronic input device 31, data at the input coordinates is sent via the data input/output control section 308 to the multimedia multiplexing-demultiplexing section 303 as general data.

The multimedia multiplexing-demultiplexing section 303, which has three types of digital input/output functions of coded speech data, coded image data, and general data, multiplexes the three types of digital signals and transmits the result via the line control section 306 to other terminals.

The line control section 306 performs communication control such as calling, connection, and disconnection of remote terminals, and data transfer control. The line control section 306 of the secretary terminal 101 accommodates and controls five lines; the line control section of each of the executive terminals 102-105 accommodates and controls four lines.

In contrast, the multimedia multiplexing-demultiplexing section 303 separates out the three types of data, coded speech data, coded image data, and general data from the data received by the line control section 306.

The separated-out coded image data is fed into the image coding-decoding section 302 which then decodes the image data into an analog video signal according to the system conforming to CCITT Recommendation H.261, then outputs the analog video signal to the video signal input/output control section 301. The analog video signal is output through the video signal input/output control section 301 to the display 2 for display. At the executive terminals 102-105, the analog video signal is also output to the large display 2a.

The separated-out coded speech data is fed into the aural signal coding-decoding section 305 which then decodes the speech data into an analog aural signal, then outputs the analog aural signal to the aural signal input/output control section 304. The analog aural signal is output through the aural signal input/output control section 304 to the speech output device 3 or 3a.

The separated-out general data is sent to the device control section 307. In response to the contents of the received general data, the device control section 307 controls the liquid crystal display 12 of the electronic tablet 6 through the data input/output control section 308.

The data storage device 202 stores data such as the contents of menu screens displayed on the liquid crystal display 12 of the electronic tablet 6, and has an interface between the data input/output control section 308 and the device control section 307.

Each of the executive terminals 102-105 includes four channels of the video signal coding-decoding section 302, multimedia multiplexing-demultiplexing section 303, and aural signal coding-decoding section 305 corresponding to four lines accommodated in the line control section 306. The aural signal input/output control section 304 has a function of mixing decoded aural signals on the four channels for output. The video signal input/output section 301 has a function of outputting decoded video signals on the four channels for display on four screens 2a into which a full screen is split.

The arts described in applications of the same applicant of this application Ser. No. 07/913,489 filed Jul. 15, 1992, Ser. No. 07/918,054 filed Jul. 24, 1992, and Ser. No. 07/838,348 filed Feb. 20, 1992 can be used for the executive terminals 102-105.

Next, the sections particular to the secretary terminal 101 are described.

The secretary terminal 101 is provided with the selector 310 which can connect the five lines accommodated in the line control section 306 to the four lines accommodated in the multimedia multiplexing-demultiplexing section 303 or the communication branch control section 311. The communication branch control section 311 performs communication control such as calling, connection, and disconnection between the secretary terminal 101 and the executive terminals 102-105 on the transmission network 110 and controls transfer of multiplexed data between the line control section 306 or the multimedia multiplexing-demultiplexing section 303 and the executive terminals 102-105. In the embodiment, line control information of calling, connection, disconnection, etc., between the secretary terminal and the executive terminals is transferred on a control line provided on the transmission network in addition to the four lines between the secretary terminal and the executive terminals.

The device control section 307 controls the operation of the selector 310 and the communication branch control section 311 in response to entries made with the small electronic input device 31 on the electronic tablet 6.

The operation of the video telephone system according to the embodiment will now be described.

Figure 4:
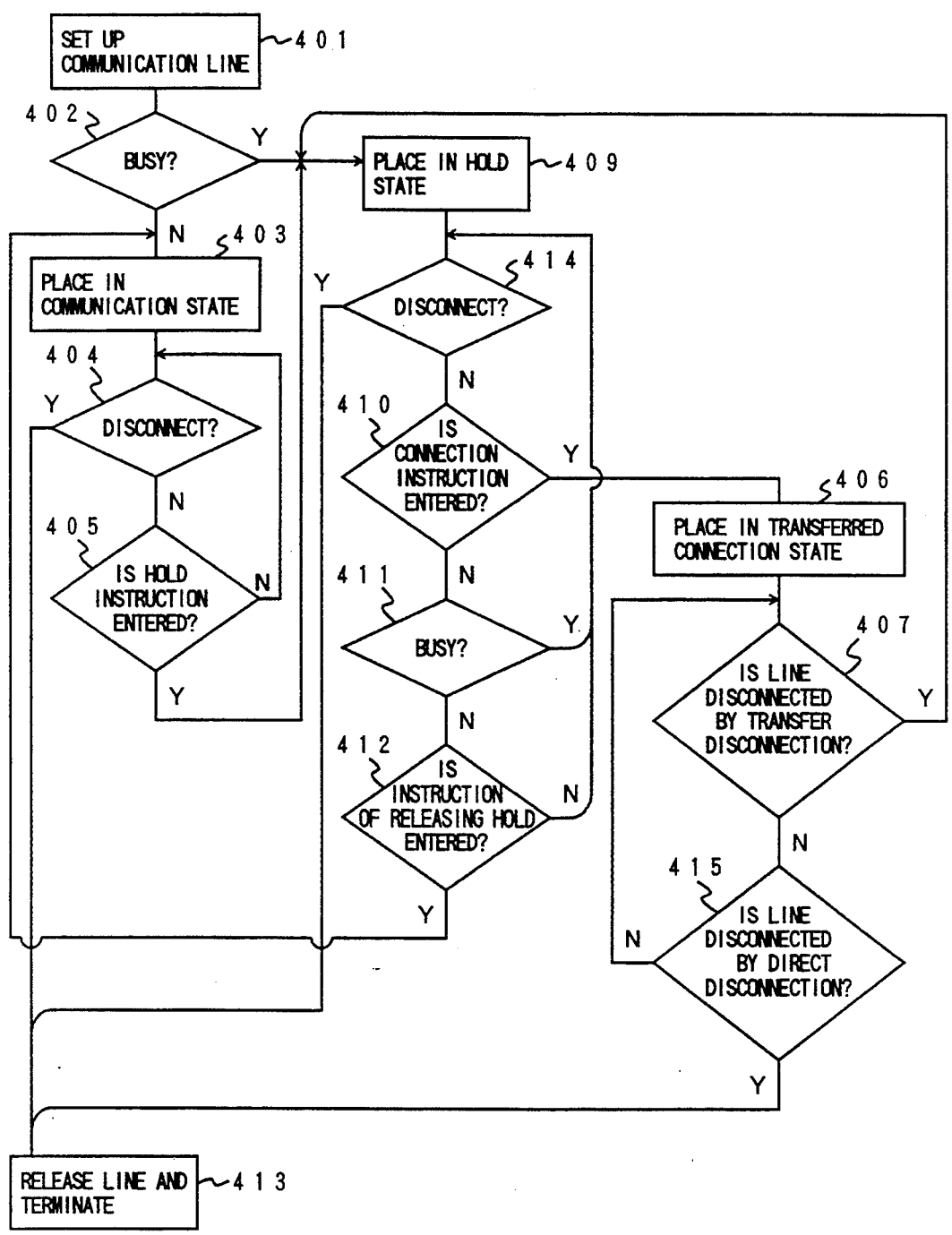
FIG. 4 is a flowchart showing a communication processing sequence executed by a secretary terminal.
Figure 5:
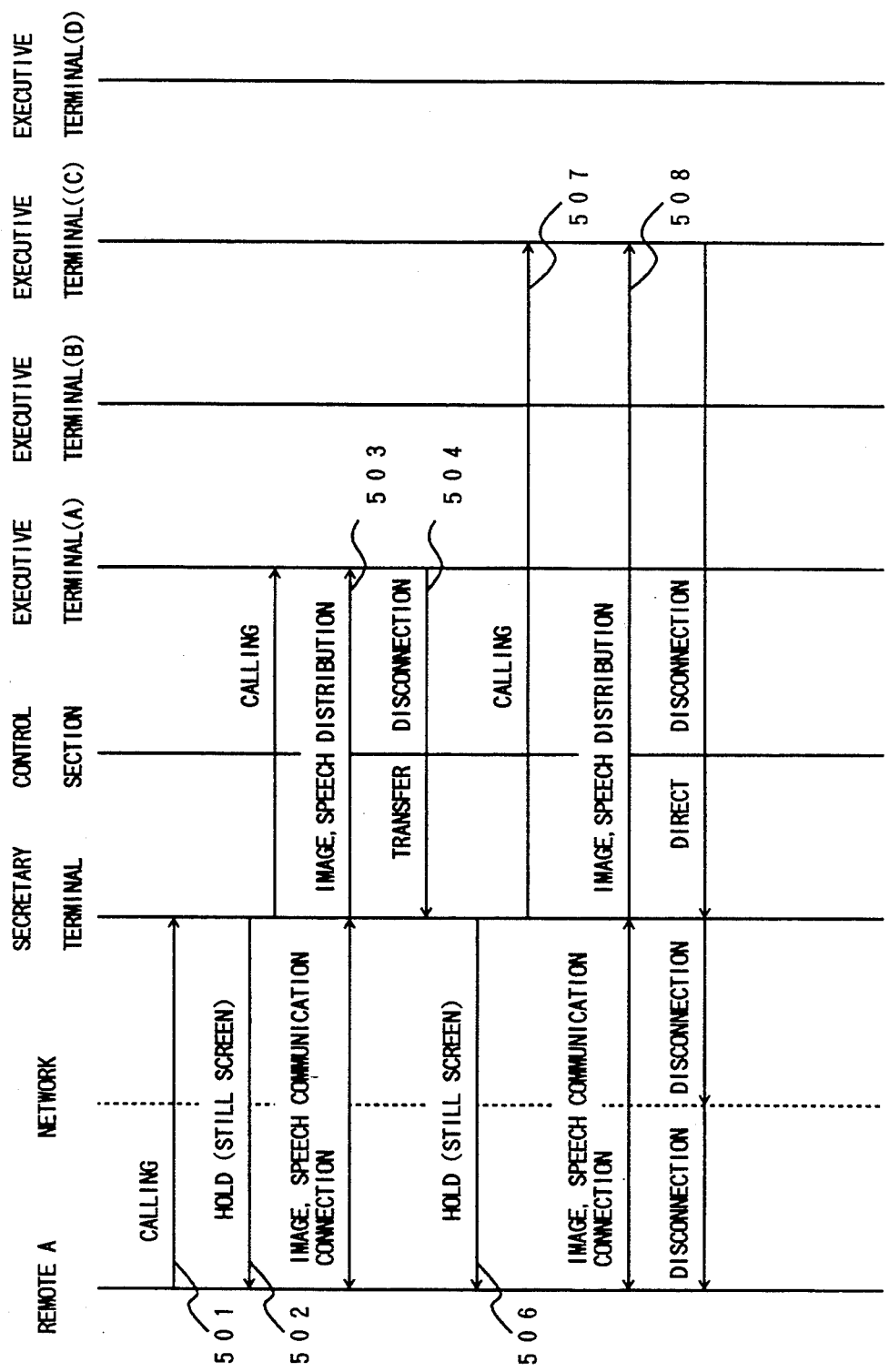
FIG. 5 is a sequence diagram showing communication operation of the video telephone system.

FIG. 4 shows a communication processing sequence executed by the device control section 307 of the secretary terminal 101 for each line of the communication network 20. FIG. 5 shows a communication sequence between the secretary terminal 101 and the executive terminal 102 of executive A by taking transfer of a call from remote terminal A 601 via the secretary terminal 101 to the executive terminal 102 as an example.

First, when a call comes in the secretary terminal 101 from the remote terminal A 601 at 501 in FIG. 5, the line control section 306 accepts the call and sets up the line between the secretary terminal 101 and the remote terminal A 601 and sends a message to that effect to the device control section 307 at step 401 in FIG. 4. If the remote terminal A is called from the secretary terminal 101, when the line between the secretary terminal 110 and the remote terminal A is set up, a message to the effect is also sent to the device control section 307. When the line is set up, the device control section 307 determines whether or not the secretary terminal 101 is busy at present at step 402 in FIG. 4. The term "busy" means the state in which speech, image, or general data is exchanged on another line, such as the secretary terminal 101, or the hold state or the state in which line not placed in call transfer state is set up. If the secretary terminal 101 is busy at present, the device control section 307 places the line between the secretary terminal 101 and the remote terminal A in the hold state at step 409 in FIG. 4 and displays a message to the effect that the line is placed in the hold state on the display 2. Placing the line in the hold state means that predetermined hold sound or image prestored in the data storage device 202 is sent to the line and that receive data from the remote terminal A 601 is discarded.

If the secretary terminal 101 is not busy, the selector 310 is controlled to connect the line to the multimedia multiplexing-demultiplexing section 303 for starting communication of speech, image, and general data between the secretary terminal 101 and the remote terminal A 601 at step 403 in FIG. 4.

After the secretary terminal 101 becomes idle at step 411 in FIG. 4, if a predetermined instruction of releasing the hold state is entered on the electronic tablet 6 at step 412 in FIG. 4, the line placed in the hold state is connected to the multimedia multiplexing-demultiplexing section 303.

In the communication, the secretary who uses the secretary terminal 101 asks the user of the remote terminal A 601 his or her business. If the secretary judges that it is necessary to get executive A, he or she enters a predetermined instruction of hold on the electronic tablet 6 to place the line between the secretary terminal 101 and the remote terminal A 601 in the hold state (502 in FIG. 5)

If the predetermined instruction of hold is entered on the electronic tablet 6 at step 405 in FIG. 4, the device control section 307 places the line between the secretary terminal 101 and the remote terminal A 601 in the hold state at step 409 in FIG. 4, and controls the communication branch control section 311 to call the executive terminal 102 of executive A and set up the line 110 and also controls the selector 310 and the communication branch control section 311 to connect the line 110 between the multimedia multiplexing-demultiplexing section 303 and the executive terminal 102 of executive A for starting communication with executive A.

Then, the secretary who uses the secretary terminal 101 informs executive A that he or she is being called from remote A 601 over the video telephone line, then enters a predetermined instruction of connecting the remote terminal A 601 and the executive terminal 102 on the electronic tablet 6.

If the predetermined instruction of connecting them is entered on the electronic tablet 6 at step 410 in FIG. 4, the device control section 307 controls the selector 310 to connect the line placed in the hold state to the line 110 between the secretary terminal 101 and the executive terminal 102 (503 in FIG. 5, step 406 in FIG. 4) and displays a message to that effect that the call is being connected to the executive terminal 102 on the electronic tablet 6.

After this, the calling party who uses the remote terminal A 601 and executive A can communicate with each other. If a predetermined entry is made on the electronic tablet 6 even during talking, each of the device control sections 307 of the secretary terminal 101 and the executive terminal 102 controls the communication branch control section 311 or the line control section 306 to transfer a message corresponding to the entry contents on the line 110. When receiving the message, the device control section of each of the terminals displays the message contents on the display 2.

In the embodiment, two types of direct disconnection and transfer disconnection are provided as attributes of disconnection of the line 110 between the executive terminal 102 and the remote terminal A 601. Disconnection from the remote terminal A 601 is attributed to direct disconnection. Disconnection from the executive terminal 102 when a predetermined instruction of transfer disconnection is entered on the electronic tablet 6 of the executive terminal 102 is attributed to transfer disconnection. Another disconnection from the executive terminal 102 is attributed to direct disconnection.

When talking between the calling party and executive A terminates and the line 110 between the executive terminal 102 of executive A and the secretary terminal 101 is disconnected by transfer disconnection (504 in FIG. 5, step 407 in FIG. 4), again the line between the secretary terminal 101 and the remote terminal A 601 is placed in the hold mode (506 in FIG. 5) and a message to the effect that the call transfer has terminated is represented on the display 2. Then, the secretary releases the hold state as appropriate and communicates with the calling party, and if necessary, transfers the call to other executive terminals 102-105 (507, 508 in FIG. 5).

On the other hand, if the line 110 between the executive terminal 102 of executive A and the secretary terminal 101 is disconnected by direct disconnection at step 415 in FIG. 4, the line between the secretary terminal 101 and the remote terminal A 601 is disconnected and processing is terminated.

Processing related to direct communication between the secretary terminal 101 and the executive terminals 102-105 or between the executive terminals 102-105 conforms to a general one-to-one communication sequence such as call - setting up line - talking - disconnection, and will therefore not be discussed.

Figure 6:
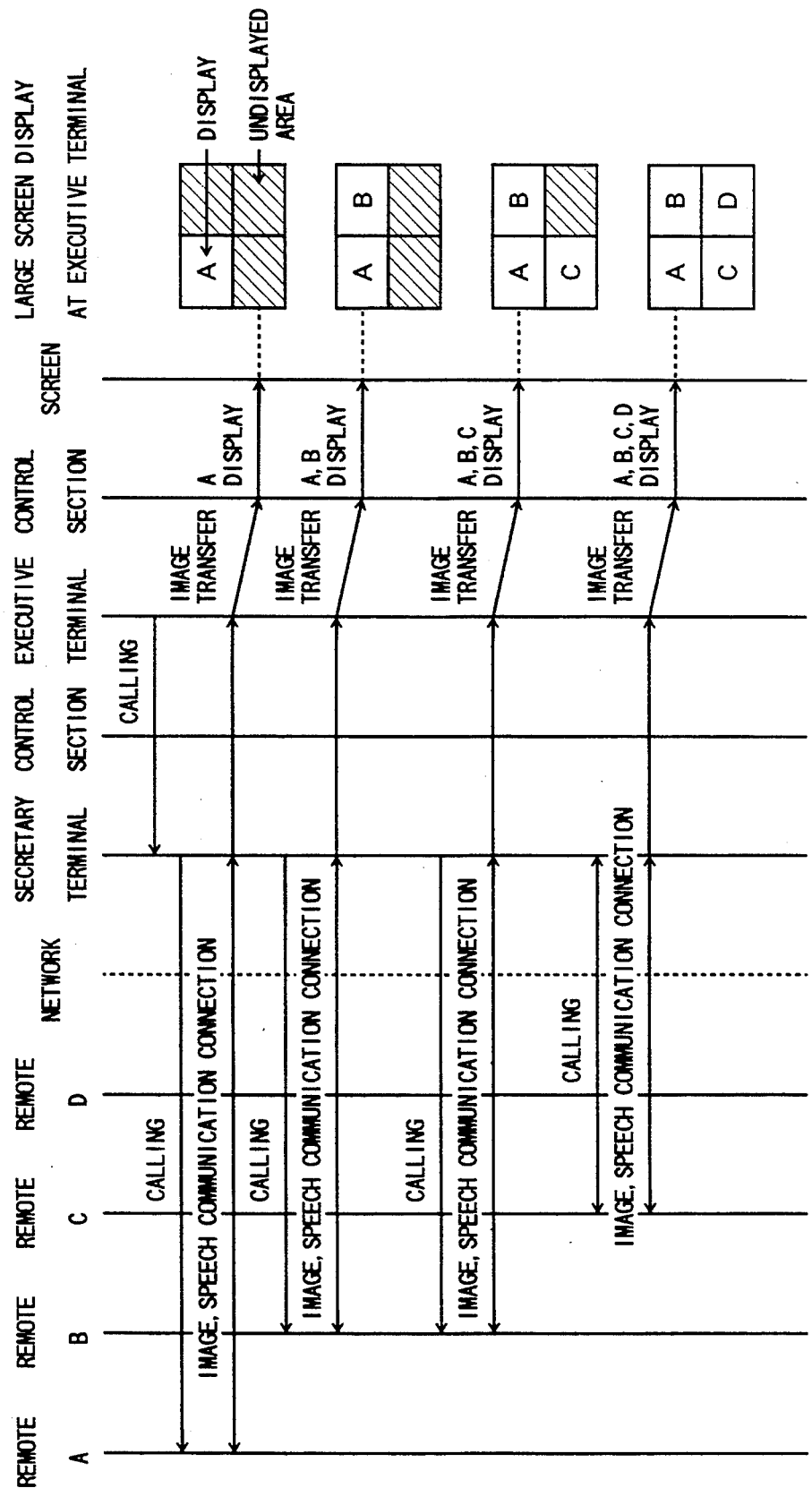
FIG. 6 is a sequence diagram showing communication operation for the video telephone system to communicate with a plurality of parties.

By the way, the secretary terminal 101 can also connect all the four lines between the secretary terminal 101 and remote terminals A 601, B 602, C 603, and D 604 to one executive terminal, as shown in FIG. 6.

For example, if executive A wants to confer with all four parties at the same time, he or she makes a general call to the four parties previously registered on the electronic tablet 6 of the executive terminal. The general call is temporarily transmitted to the secretary terminal 101. Upon receiving it, the secretary terminal 101 calls the remote terminals, sets up the lines between the terminal 101 and the remote terminals in sequence, informs the called parties to the business, and then connects the lines to the executive terminal 102 of executive A.

The video signals transmitted from the remote terminals over the lines thus connected in sequence are decoded at the executive terminal 102, and the images represented by the decoded video signals are displayed by the video signal input/output control section 301 on four screens into which the full screen of the large display 2a (see FIG. 2) is split, as shown in FIG. 6. The aural signals from the four parties are also mixed and speech is output through the speech output device 3a. Thus, a conference at five points can be held at the same time.

In addition, the selector 310 of the secretary terminal may also be provided with an exchange function of the four lines of the local transmission network 110 to hold a local conference at the four executive terminals 102–105.

A radio transmitter-receiver may also be installed in each of the communication branch control section 308 of the secretary terminal 101 and the line control sections 306 of the executive terminals 102–105 to use the local transmission network 110 as a radio transmission network.

The video signal input/output control section 301 of each of the secretary terminal 101 and the executive terminals 102–105 may also be provided with a fade-in display control circuit for temporarily darkening the screen of the display and then gradually restoring brightness to the normal value when the screen display is changed. The fade-in display control circuit can be implemented by providing an amplification circuit capable of changing its amplification factor with a given time constant as an amplification circuit of video output signals, providing a circuit for digitally manipulating decoded image data values, or providing a circuit for changing the conversion factor of a D/A converter which converts decoded image data into analog video signals with a given time constant.

Next, the electronic tablet 6 will be discussed.

Figure 7:
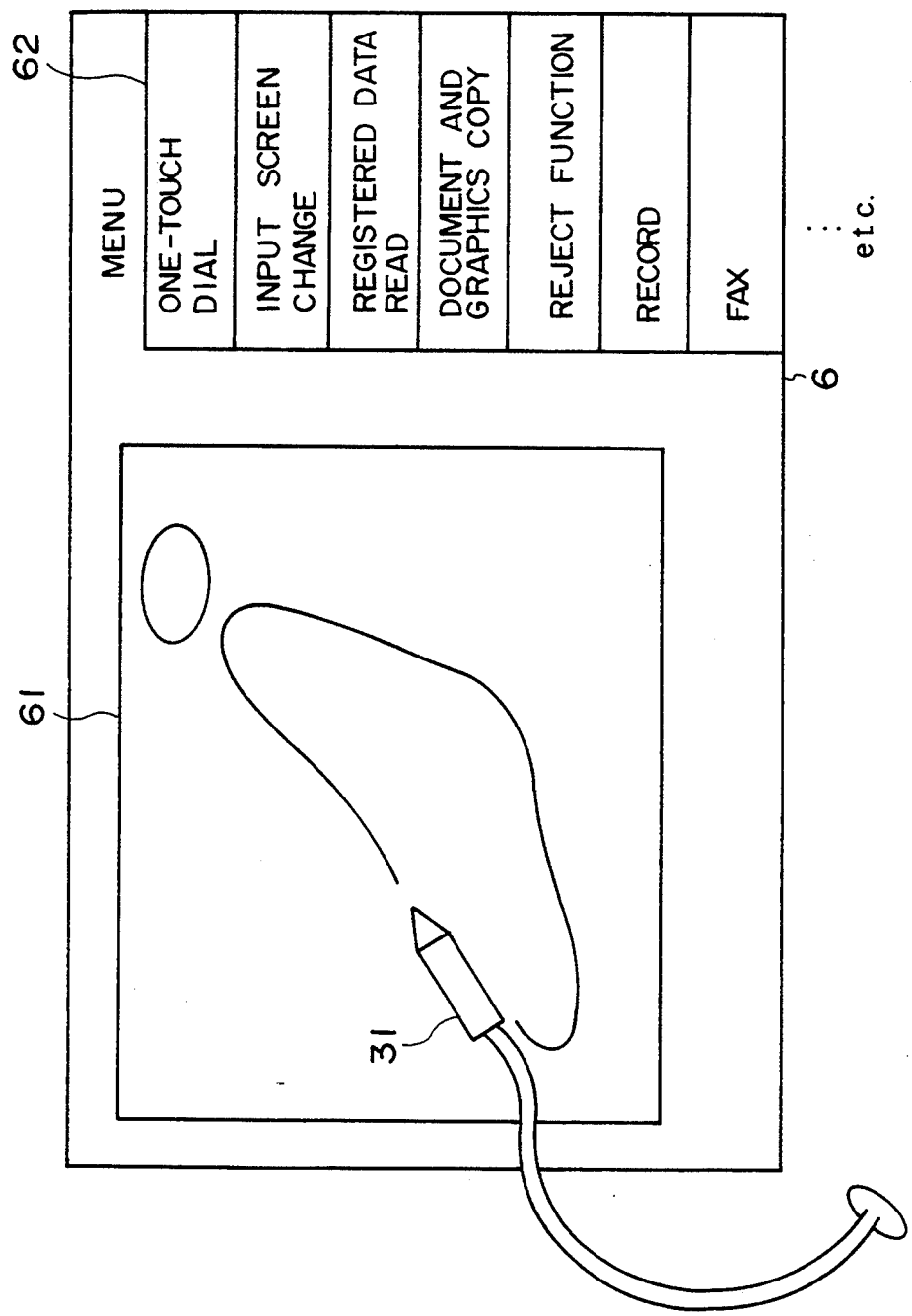
FIG. 7 is an illustration showing a display example of an electronic tablet used with the video telephone system.
Figure 8:
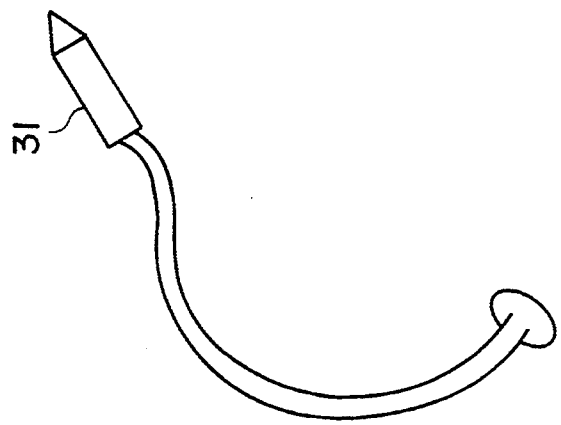
FIG. 8 is an illustration showing another display example of the electronic tablet used with the video telephone system.

FIGS. 7 and 8 show display and input screens of the electronic tablet 6, wherein numeral 61 is a write input area for accepting a handwritten entry. The contents drawn in the area with the small electronic input device 31 are displayed at the positions corresponding to the drawing positions on the liquid crystal display panel 12. As described above, drawing information indicating the contents are immediately transmitted to a remote terminal, and are displayed on the liquid crystal display panel 12 of the electronic tablet 6 by the device control section 308 at the remote terminal.

Thus, the same screen can be shared among them.

Materials, etc., stored in the data storage device 202 are displayed in the write input area 61 of the electronic tablet 61 and additional characters, graphics, etc., can be written on the electronic tablet 6 with the small electronic input device 31 for supplementary explanation while conversation is being held.

Next, numeral 62 is a menu display area for displaying menus such as facsimile transmission, conference record, one-touch dial, registered data read, input screen change, document and graphics copy, and reject. One of the menus is selected in response to the entry position with the small electronic input device, and processing corresponding to the selected menu is performed by the device control section 307.

The facsimile communication terminal transmission is used to transmit information drawn in the write input area 61 to a remote terminal as FAX information. The conference record is provided to specify recording of received images and speeches of a remote terminal in the data storage device 202, thereby eliminating the need for taking notes during the conference.

The one-touch dial is a menu for instructing the system to read an office telephone number list or a private telephone number list shown in FIG. 8 from the data storage device 202 and display it on the electronic tablet 6. If the user selects one or more parties to be called on the displayed office telephone number list or private telephone number list, the device control section 307 calls the selected party.

The registered data read is used to instruct the system to display common materials such as sales result graphs stored in the data storage device 202 on the electronic tablet 6 during conversation with the associated party, thereby enabling the user to read the materials without interrupting the conversation for smooth progress of the conference.

The input screen change is a menu for selecting an input image through the camera 1 or that through an external camera connected to an external input/output terminal 301a connected to the video signal input/output control section 301 for the image to be transmitted, thereby enabling transmission of screens of the outer weather or the interior of the shop as well.

The document and graphics copy is used to make a hard copy of the contents displayed in the write input area 61, thereby eliminating the need for taking notes of the display contents for later reference.

The reject function, which is a menu provided only for the executive terminals, is used to specify the transition to the reject mode of calling the executive terminals 102–105. When the executive is conferring with someone or does not want to be interrupted or to respond to a call from the secretary, the reject function is useful.

What is claimed is:

1. A video telephone system comprising:
a master video telephone terminal connected to a communication network; and
a plurality of slave video telephone terminals connected to said master video telephone terminal;
(I) wherein said master video telephone terminal comprising:
video generating means for generating a video signal,
means for coding the video signal generated by said video generating means,
speech generating means for generating an aural signal;
means for coding the aural signal generated by said speech generating means,
a multiplexing-demultiplexing section which multiplexes the coded aural signal and the coded video signal for transmission and separates out a coded aural signal and coded video signal from a received signal,
a line control section which controls calls on the communication network and transfer of the multiplexed coded aural and video signals through the communication network,
means for decoding the separated-out coded video signal,
means for decoding the separated-out coded aural signal,
means for outputting speech represented by the decoded aural signal,
means for displaying an image represented by the decoded video signal,
input means for accepting an instruction of a user of said master video telephone terminal,
a communication branch control section which controls calls between said master video telephone terminal and said plurality of slave video telephone terminals and transfer between said line control section or said multiplexing-demultiplexing section and said plurality of slave video telephone terminals, and device control means being responsive to the instruction entered through said input means for specifying operation of said communication branch control section;

(II) wherein each of said plurality of slave video telephone terminals comprises:

video generating means for generating a video signal, means for coding the video signal output by said video generating means, speech generating means for generating an aural signal, means for coding the aural signal output by said speech generating means, a multiplexing-demultiplexing section which multiplexes the coded aural signal and the coded video signal for transmission and separates out a coded aural signal and coded video signal from a received signal, a line control section which controls calls between said master and slave video telephone terminals and transfer of the multiplexed coded aural and video signals between said master and slave video telephone terminals, means for decoding the separated-out coded video signal, means for decoding the separated-out coded aural signal, means for outputting a speech represented by the decoded aural signal, means for displaying an image represented by the decoded video signal, input means for accepting an instruction of a user and device control means responsive to the instruction entered through said input means, for specifying operation of said line control section.

2. A video telephone system as claimed in claim 1 wherein said master video telephone terminal further comprises:

means, when multiplexed coded aural and video signals are being transferred between said line control section of the master video telephone and a called or calling slave video telephone terminal, for sending a message to said slave video telephone terminal; and wherein each of said slave video telephone terminals further comprises:

means, upon receipt of the message from said master video telephone terminal, for overlaying characters or graphics corresponding to contents of the received message on the screen of said means for displaying.

3. A video telephone system as claimed in claim 1 wherein said input means of each of said master and slave video telephone terminals is an electronic tablet comprising a transparent input panel for reading handwritten information mounted on a display panel that can be controlled by said device control means.

4. A video telephone system comprising:

a master video telephone terminal connected to a communication network; and a plurality of slave video telephone terminals connected to said master video telephone terminal;

(I) wherein said master video telephone terminal comprises:

(i) a line control section which controls a plurality of calls on the communication network at the same time, (ii) a communication branch control section which controls a plurality of calls between said master video telephone terminal and said plurality of slave video telephone terminals at the same time, and (iii) transfer controlling means for controlling transfer of calls after communications with the master video telephone terminal are started, in any one of:

(a) a first mode wherein a plurality of calls controlled by said line control section are transferred to a slave video telephone via said communication branch control section at the same time, (b) a second mode wherein each of a plurality of calls controlled by said line control section is transferred to a slave video telephone, respectively, via said communication branch control section at the same time, and (c) a third mode wherein each of a plurality of calls, between each of said slave video telephones, controlled by branch control section is transferred to another slave video telephone respectively via said communication branch control section at the same time; and (II) wherein each of said plurality of slave video telephone terminals comprises:

(i) a line control section which controls a plurality of calls between said master and slave video telephone terminals at the same time.

5. A video telephone system as claimed in claim 4 wherein each of said master and slave video telephone terminals is a video telephone terminal which can communicate simultaneously with video telephone terminals at a plurality of points and has means for displaying images received from the video telephone terminals at the points on a plurality of screens into which a full screen is split.

* * * * *